United States Patent
Yamamoto

(10) Patent No.: US 9,561,588 B2
(45) Date of Patent: Feb. 7, 2017

(54) ROBOT SYSTEM INCLUDING PLURALITY OF ROBOT CONTROL DEVICES

(71) Applicant: FANUC Corporation, Yamanashi (JP)

(72) Inventor: Tomoyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 8 days.

(21) Appl. No.: 14/627,107

(22) Filed: Feb. 20, 2015

(65) Prior Publication Data

US 2015/0239120 A1 Aug. 27, 2015

(30) Foreign Application Priority Data

Feb. 21, 2014 (JP) .................................. 2014-032243

(51) Int. Cl.
*B25J 9/16* (2006.01)
*H04L 29/08* (2006.01)

(52) U.S. Cl.
CPC ................ *B25J 9/163* (2013.01); *B25J 9/1602* (2013.01); *H04L 67/10* (2013.01); *G05B 2219/39445* (2013.01)

(58) Field of Classification Search
CPC .......... B25J 9/1602; B25J 9/163; H04L 67/10; G05B 2219/39445
See application file for complete search history.

(56) References Cited

U.S. PATENT DOCUMENTS

| 3,924,230 A | 12/1975 | Dunne |
| 2007/0096674 A1* | 5/2007 | Hashimoto ............ B25J 9/1674 318/568.13 |

FOREIGN PATENT DOCUMENTS

| CN | 101142062 A | 3/2008 |
| CN | 103038028 A | 4/2013 |
| JP | 2672417 B2 | 11/1997 |
| JP | 2007-268662 A | 10/2007 |
| JP | 2008-9872 A | 1/2008 |
| JP | 2008-80474 A | 4/2008 |
| JP | 2011-67892 A | 4/2011 |
| JP | 2011-67894 A | 4/2011 |
| JP | 2011-224776 A | 11/2011 |
| JP | 2012-148350 A | 8/2012 |
| JP | 5011474 B2 | 8/2012 |

* cited by examiner

*Primary Examiner* — Yuen Wong
(74) *Attorney, Agent, or Firm* — Hauptman Ham, LLP

(57) ABSTRACT

A robot system including robot control devices, a network, and a mode changing device which switches between an automatic operation mode and teaching mode. In the state where the mode changing device selects the automatic operation mode, drive power is supplied to all of the robots regardless of the state of the enable device. In the state where the mode changing device selects the teaching mode, when the enable device does not permit operation of at least two robots, the drive power of all of the robots is cut.

3 Claims, 3 Drawing Sheets

ROBOT SYSTEM INCLUDING PLURALITY OF ROBOT CONTROL DEVICES

RELATED APPLICATIONS

The present application claims priority to Japanese Application Number 2014-032243, filed Feb. 21, 2014, the disclosure of which is hereby incorporated by reference herein in its entirety.

BACKGROUND OF INVENTION

1. Field of the Invention

The present invention relates to a robot system to which a plurality of robot control devices are connected by a network.

2. Description of the Related Art

In the related art, one robot control device which controls one robot has one teaching control panel connected to it. For this reason, when a single operator teaches several robots, the operator has to prepare several teaching control panels and successively operate them. Further, while an operator can only operate a single teaching control panel at one time, it is necessary to prepare a plurality of teaching control panels, so the cost of the robot system increases.

Japanese Patent No. 2672417 discloses a teaching control panel which can be detachably attached to a robot system. In this case, the teaching control panel can be used in common for a plurality of robot control devices. Further, Japanese Patent No. 5011474 discloses connecting a single teaching control panel to two robot control devices through a network.

However, in Japanese Patent No. 2672417, when a single teaching control panel is used to teach several robots, it is necessary to attach and detach the teaching control panel repeatedly for the number of robots and the teaching operation becomes extremely troublesome. Further, in Japanese Patent No. 5011474, when teaching a robot, the robot could suddenly start moving and the safety of the operator cannot be secured.

The present invention was made in consideration of this situation and has as its object to provide a robot system which cuts costs and improves the efficiency of the teaching work and which can secure the safety of the operator.

SUMMARY OF THE INVENTION

To achieve the above object, according to a first aspect, there is provided a robot system comprising at least two robot control devices which respectively control at least two robots, a network which connects the at least two robot control devices with each other, a teaching control panel which can be connected with the network and is used for teaching operations of the at least two robots, an enable device which is provided at the teaching control panel and which permits operation of the at least two robots, and a mode changing device which is connected to the network and which selects either an automatic operation mode by which the at least two robots are automatically operated and a teaching mode by which the teaching control panel is used to teach the at least two robots, the existence of connection of the teaching control panel to the network, the state of the enable device, and the mode which is selected by the mode changing device are transmitted through the network to the at least two robot control devices, in the state where the mode changing device selects the automatic operation mode, regardless of the state of the enable device, drive power of all of the robots can be supplied, and in the state where the mode changing device selects the teaching mode, when the enable device does not permit operation of the at least two robots, drive power of all of the robots is cut.

According to a second aspect, there is provided a robot system comprising at least two robot control devices which respectively control at least two robots, a network which connects the at least two robot control devices with each other, a teaching control panel which can be connected with the network and is used for teaching operations of the at least two robots, an enable device which is provided at the teaching control panel and which permits operation of the at least two robots, and mode changing devices which are respectively provided at the at least two robot control devices and which select either an automatic operation mode by which the at least two robots are automatically operated and a teaching mode by which the teaching control panel is used to teach the at least two robots, the existence of connection of the teaching control panel to the network, the state of the enable device, and the modes which are selected by the mode changing devices are transmitted through the network to the at least two robot control devices, in the state where all of the mode changing devices select the automatic operation mode, regardless of the state of the enable device, drive power of all of the robots can be supplied, in the state where the mode changing device of at least one of the robot control devices selects the teaching mode and the mode changing devices of the remaining robot control devices select the automatic operation mode, when the enable device permits operation of the at least two robots, drive power of the robot of the at least one of the robot control devices can be supplied, and in the state where the mode changing device of at least one of the robot control devices selects the teaching mode and the mode changing devices of the remaining robot control devices select the automatic operation mode, when the enable device does not permit operation of the at least two robots, drive power of the robot of the at least one of the robot control devices is cut off.

According to a third aspect, there is provided the second aspect wherein when the mode changing device of the at least one of the robot control devices selects the teaching mode and the mode changing devices of the remaining robot control devices select the automatic operation mode, drive power to the robots of the remaining robot control devices is cut off.

According to a fourth aspect, there is provided the first or second aspect wherein when at least two of the teaching control panels are simultaneously connected to the network, drive power of all of the robots is cut off.

According to a fifth aspect, there is provided the first or second aspect wherein the teaching control panel comprises an emergency stop device, and if the emergency stop device is operated, drive power of all of the robots is cut off.

According to a sixth aspect, there is provided the first aspect wherein when the teaching control panel is disconnected from the network and the mode changing device selects the teaching mode, drive power is cut to all of the robots.

According to a seventh aspect, there is provided the second aspect wherein when the teaching control panel is disconnected from the network and the mode changing device of the at least one of the robot control devices selects the teaching mode and the mode changing devices of the remaining robot control devices select the automatic operation mode, drive power of the robot of the at least one of the robot control devices is cut off.

These and other objects, features, and advantages of the present invention will become clearer from the detailed description of typical embodiments of the present invention which are shown in the attached drawings.

DETAILED DESCRIPTION

Below, embodiments of the present invention will be explained with reference to the attached drawings. In the following figures, similar members are assigned similar reference notations. To facilitate understanding, these figures are suitably changed in scale.

Figure 1:
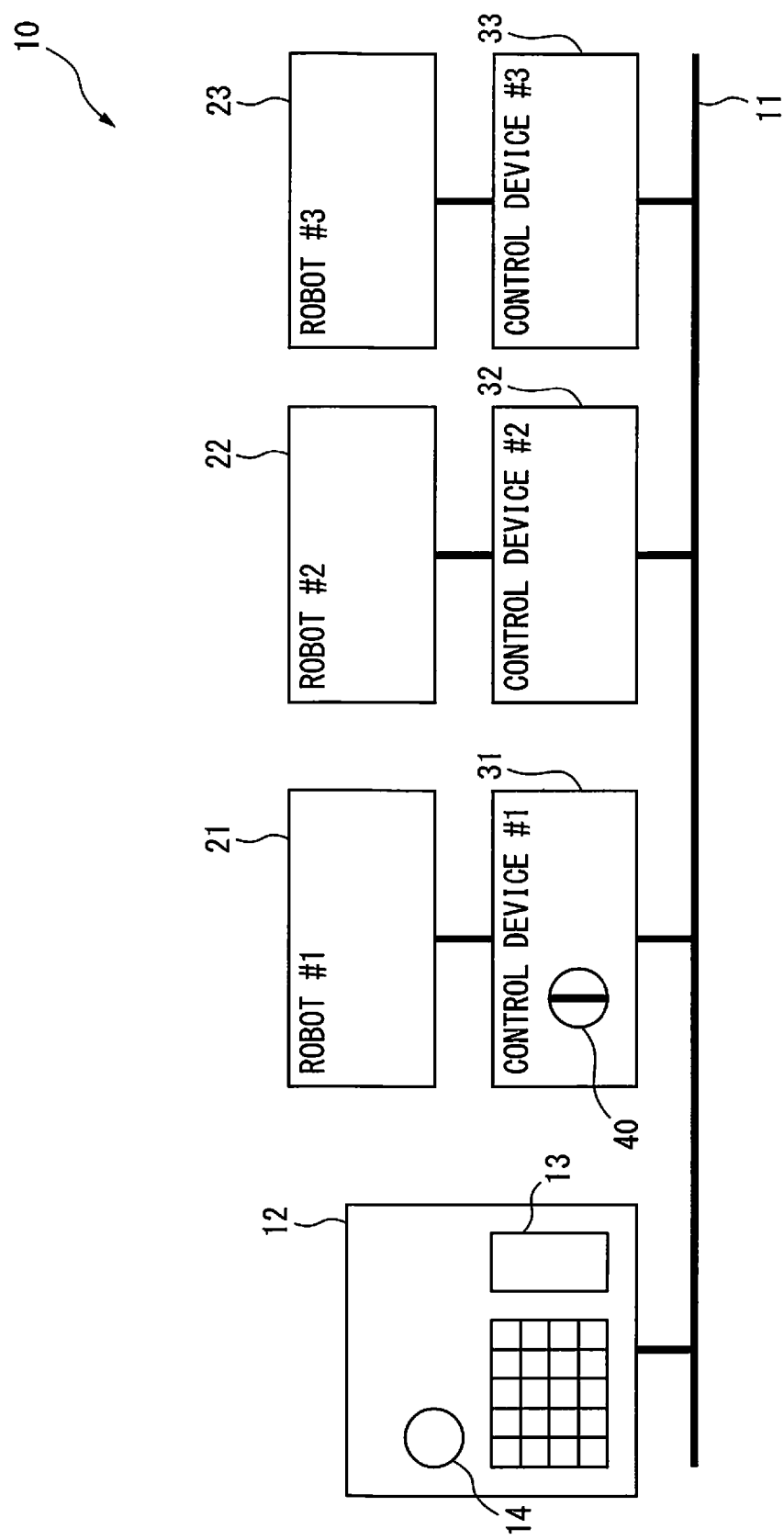
FIG. 1 is a block diagram of a robot system according to a first embodiment of the present invention.

FIG. 1 is a block diagram of a robot system according to a first embodiment of the present invention. As shown in FIG. 1, the robot system 10 includes a first robot control device 31 which is connected to a first robot 21, a second robot control device 32 which is connected to a second robot 22, and a third robot control device 33 which is connected to a third robot 23. Each of the robot control devices 31 to 33 control the corresponding robots 21 to 23. The robots 21 to 23 are, for example, vertical multiarticulated robots.

As shown in FIG. 1, the first robot control device 31 to the third robot control device 33 are connected with each other by the network 11. The network 11 of the robot system 10 is for example an Ethernet®. The network 11 may be a cable connection or a wireless connection.

Note that, more robot control devices (not shown) which correspond to more robots (not shown) may also be connected to the network 11. The same is true in the later explained embodiments. Further, control devices (not shown) other than the robot control devices 31 to 33 may be connected to the network 11.

Furthermore, in FIG. 1, a single teaching control panel 12 is directly connected to the network 11. The teaching control panel 12 is used to perform teaching operations of the robots 21 to 23. As shown in FIG. 1, the teaching control panel 12 comprises an enable device 13 and an emergency stop button 14.

The enable device 13 is, for example, a three-position switch. In the state where the operator takes his hand off the switch and the state where the operator strongly grips the switch, operation of the robots 21 to 23 is prohibited. Further, in the state where the operator lightly grips the switch, operation of the robots 21 to 23 is permitted.

In FIG. 1, the teaching control panel 12 which comprises the enable device 13 is connected to the network 11. However, such a teaching control panel 12 may be connected to one robot control device, for example, the first robot control device 31, and the teaching control panel 12 may be indirectly connected to the network 11 through the first robot control device 31.

Furthermore, in FIG. 1, the first robot control device 31 comprises a mode changing switch 40. The mode changing switch 40 performs the role of switching between an automatic operation mode and a teaching mode. When the automatic operation mode of the mode changing switch 40 is selected, regardless of the state of the enable device 13 of the teaching control panel 12, it is possible to supply drive power to all of the robots 21 to 23. For this reason, in the automatic operation mode, it is possible to automatically operate the robots 21 to 23.

When the teaching mode of the mode changing switch 40 is selected and the enable device 13 of the teaching control panel 12 does not prohibit operation of the robots, it is possible to supply drive power to all of the robots 21 to 23. In this case, the teaching control panel 12 can be used for a teaching operation for one or more of the robots 21 to 23. As opposed to this, when the teaching mode of the mode changing switch 40 is selected and the enable device 13 of the teaching control panel 12 prohibits operation of the robots, the drive power of all of the robots 21 to 23 is cut off.

When the teaching mode is selected, the operator can operate the enable device 13 of the teaching control panel 12 to cut the drive power of all of the robots 21 to 23 for which teaching operations are to be performed. Therefore, the operator makes the robots 21 to 23 stop at the time of teaching operations. For this reason, in the present invention, the safety of the operator can be secured.

Further, in FIG. 1, the mode changing switch 40 is indirectly connected to the network 11 through the first robot control device 31. However, independent apparatuses (not shown) provided with mode changing switches 40 may also be directly connected to the network 11.

Alternatively, it is also possible to arrange the mode changing switch 40 at the teaching control panel 12 and have the mode changing switch 40 indirectly connected to the network 11 through the teaching control panel 12. In this case, in the state where the teaching control panel 12 is not connected to the network 11, the mode changing switch 40 is deemed to have selected the automatic operation mode. Therefore, in this case, drive power can be supplied to the robots 21 to 23.

In this connection, consider the case where another teaching control panel (not shown) is connected to the network 11. Assume that the other teaching control panel (not shown) is configured similar to the teaching control panel 12 which is shown in FIG. 1. Furthermore, when the mode changing switch 40 selects the teaching mode and the enable devices 13 of the two teaching control panels do not prohibit the operations of the robots 21 to 23, it is possible to supply drive power to all of the robots 21 to 23. In this case, the teaching control panel 12 or the other teaching control panel (not shown) can be used to perform the teaching operations of the plurality of robots 21 to 23.

Consider the case where in the state where the mode changing switch 40 selects the teaching mode, an operator other than the operator who operates the teaching control panel 12 connects another teaching control panel (not shown) to the network 11. In this case, these operators work in the vicinity of the robots 21 to 23. In such a case, if the enable device 13 of at least one of the teaching control panel 12 and the other teaching control panel (not shown) is operated so as to prohibit operations of the robots 21 to 23, the drive power of all of the robots 21 to 23 is cut off. In other words, one operator can operate the enable device 13 to cut off the drive power of all of the robots for which the teaching work is performed. For this reason, it will be understood that these operators can safety perform the teaching operation.

Further, when none of the teaching control panels 12 is connected to the network 11 and the mode changing switch 40 selects the teaching mode, the drive power of all of the robots 21 to 23 is cut off. In other words, in the state where regardless of the teaching control panel 12 being disconnected and the teaching mode being selected, the drive power of the robots 21 to 23 can be cut off. Therefore, the safety of the operator can be secured. Note that, when the mode changing switch 40 selects the automatic operation mode, the robots 21 to 23 are operated.

In this way, in the first embodiment of the present invention, if preparing a single teaching control panel 12, the robots 21 to 23 can be taught operations, so the costs can be kept down. Furthermore, when, in the state where the teaching mode is selected, the operator uses the enable device 13 to prohibit operations of the robots 21 to 23, the drive power of all of the robots 21 to 23 to be taught is cut off. Therefore, it will be understood that the operator can perform the teaching operations safely and the efficiency of the teaching operations can also be improved.

Figure 2:
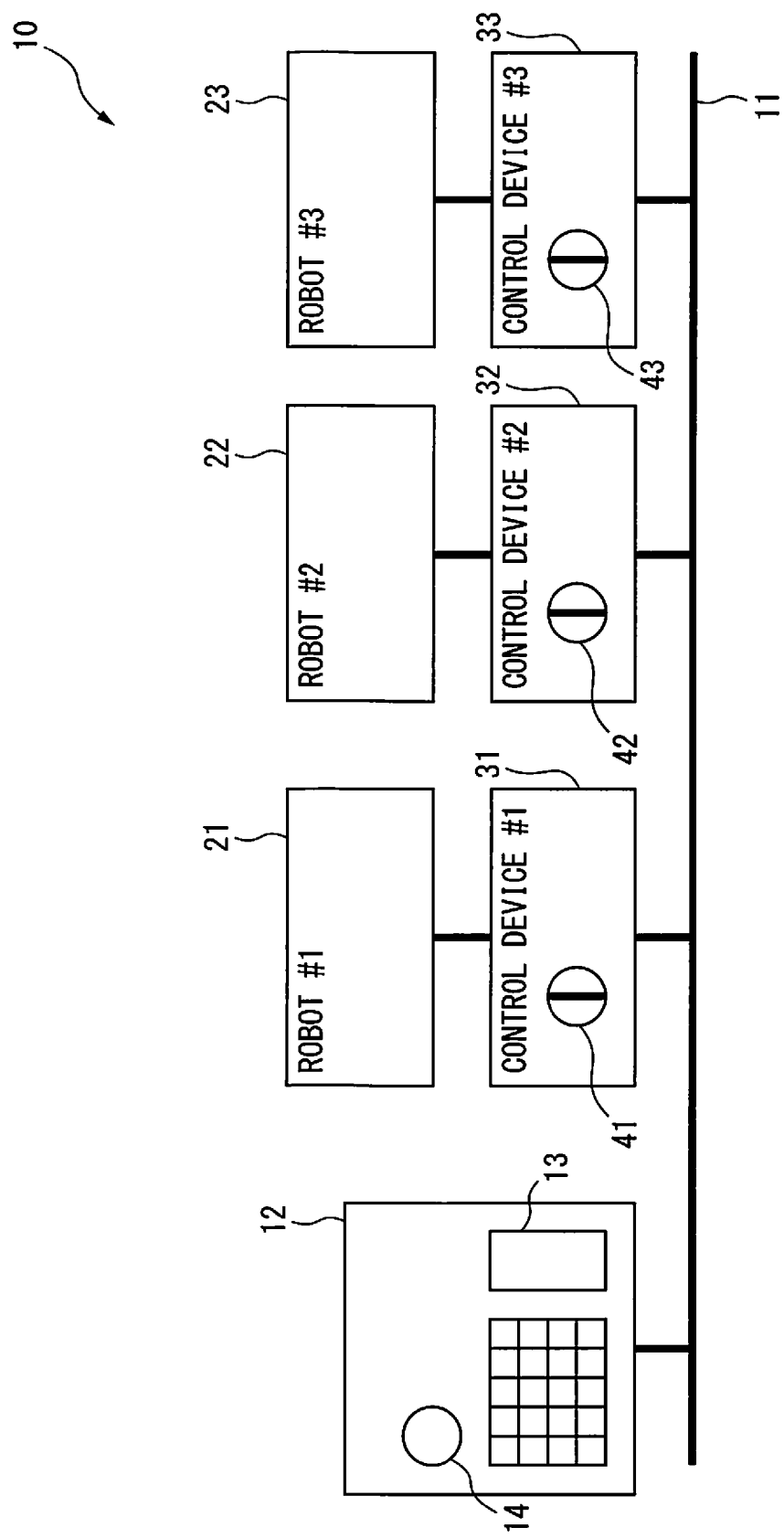
FIG. 2 is a block diagram of a robot system according to a second embodiment of the present invention.

FIG. 2 is a block diagram of a robot system according to a second embodiment of the present invention. In FIG. 2, the first robot control device 31 to third robot control device 33 are provided with mode changing switches 41 to 43, respectively. The mode changing switches 41 to 43 are similar to the mode changing switch 40 and perform the role of switching the automatic operation mode and the teaching mode. Therefore, in the second embodiment, the mode changing switches 41 to 43 are used to separately select the automatic operation mode or teaching mode for the robot control devices 31 to 33.

When the mode changing switches 41 to 43 of all of the robot control devices 31 to 33 select the automatic operation mode, it is possible to supply the drive power of all of the robots 21 to 23 regardless of the enable device 13 of the teaching control panel 12. For this reason, in the automatic operation mode, the robots 21 to 23 can be automatically operated.

Furthermore, for example, consider the case where the mode changing switch 41 of the first robot control device 31 selects automatic operation mode and the enable device 13 does not prohibit operation of the robots 22 and 23. In this case, it is possible to supply drive power of the second robot 22 and third robot 23 which correspond to the second robot control device 32 and the third robot control device 33. Therefore, the teaching control panel 12 can be used for the teaching operation of at least one of the second robot 22 and the third robot 23.

Further, when operating the enable device 13 of the teaching control panel 12 to prohibit operation of the robots 22 and 23, it is possible to cut off the drive power of the second robot 22 and the third robot 23 for which teaching operations are to be performed, therefore the operator can perform the teaching operations safely.

In this connection, consider the case of connecting another teaching control panel (not shown) to the network 11. The other teaching control panel (not shown) is assumed to be configured the same as the teaching control panel 12 which is shown in FIG. 1. Furthermore, for example, assume that the mode changing switch 41 of the first robot control device 31 selects the automatic operation mode and the mode changing switches 42 and 43 of the second robot control device 32 and third robot control device 33 select the teaching mode. Furthermore, assume that the enable devices 13 of the teaching control panel 12 and the other teaching control panel (not shown) do not prohibit the operations of the robots 21 to 23.

In such a case, it is possible to supply drive power of the second robot 22 and third robot 23. Further, the teaching control panel 12 and the other teaching control panel (not shown) can be used to perform a teaching operation of at least one of the second robot 22 and third robot 23.

Further, for example, consider the case where in the state where the mode changing switch 41 of the first robot control device 31 selects the automatic operation mode and the mode changing switches 42 and 43 of the second robot control device 32 and the third robot control device 33 select the teaching mode, an operator separate from the operator who operates the teaching control panel 12 connects another teaching control panel (not shown) to the network 11. In this case, these operators work in the vicinity of the robots 21 to 23. In this case, if the enable device 13 of at least one of the teaching control panel 12 and the other teaching control panel (not shown) is operated so as to prohibit the operations of the robots 21 to 23, the drive power of the second robot 22 and the third robot 23 is cut off. In other words, by one operator operating the enable device 13, the drive power of all of the robots 22 and 23 for which teaching operations are being performed can be cut. For this reason, it will be understood that these operators can perform the teaching operations safely.

Further, when neither teaching control panel 12 nor the other teaching control panel (not shown) is connected to the network 11 and the mode changing switches 42, 43 select the teaching mode, the drive power of the second robot 22 and the third robot 23 is cut off. In other words, in the state where, regardless of the teaching control panel 12 being disconnected, the teaching mode is selected, the drive power of the robots 21 to 23 can be cut off. Therefore, the safety of the operators can be secured. Note that, when the mode changing switch 40 selects the automatic operation mode, the robots 21 to 23 operate. Further, in the second embodiment, it will be clear that generally effects similar to the above-mentioned first embodiment can be obtained.

Figure 3:
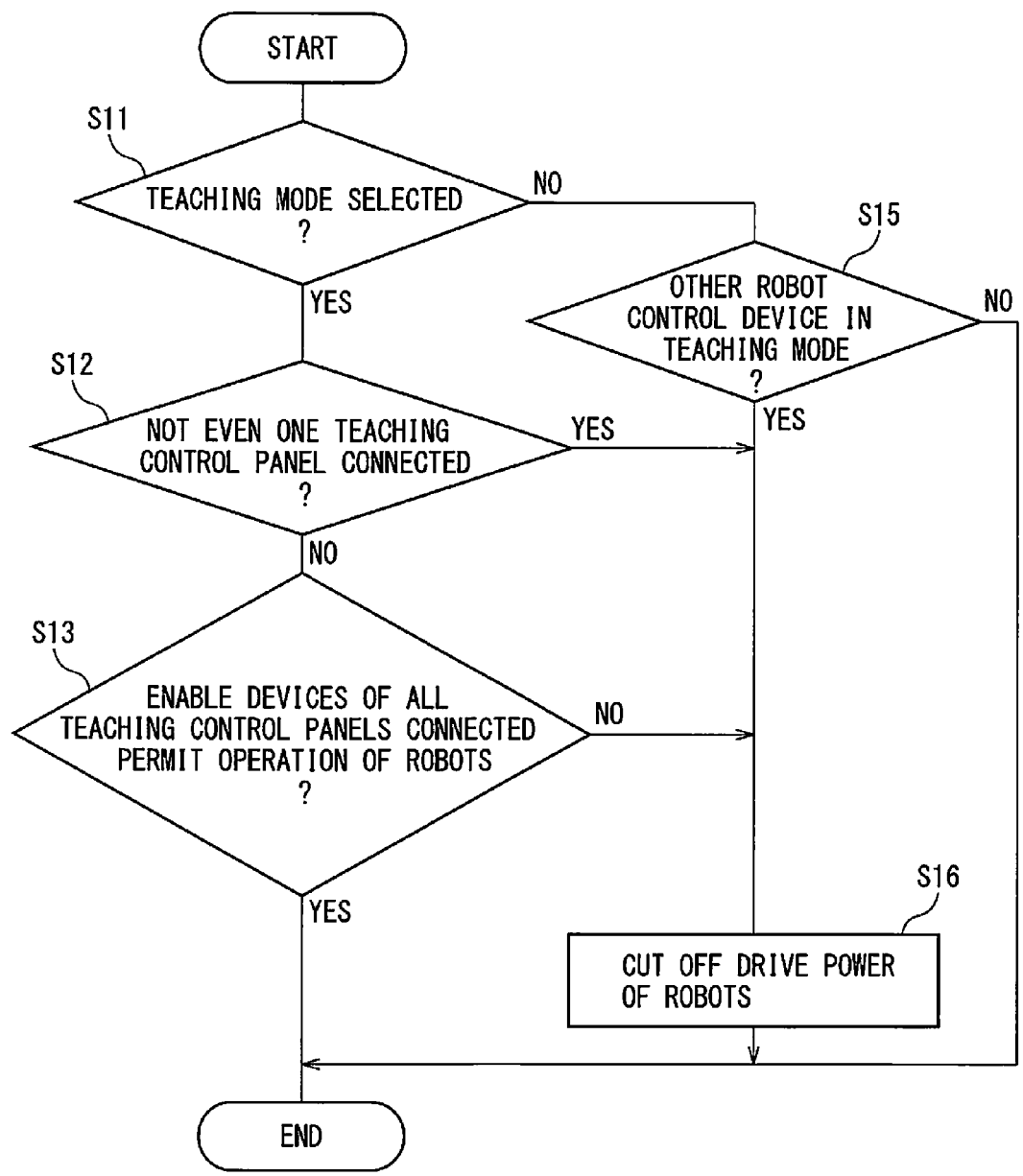
FIG. 3 is a flow chart which shows the operation of the robot system according to the second embodiment of the present invention.

In this regard, FIG. 3 is a flow chart which shows the operation of the robot system according to a second embodiment of the present invention. The processing which is shown in FIG. 3 is assumed to be performed by the first robot control device 31.

First, at step S11, it is judged if the mode changing switch 41 of the first robot control device 31 has selected the teaching mode. Further, when the teaching mode is selected, at step S12, it is judged if not even the one teaching control panel 12 is connected to the network 11.

When at least one of the teaching control panel 12 and another teaching control panel (not shown) is connected to the network 11, the routine proceeds to step S13. At step S13, it is judged if the enable device 13 of the teaching control panel which is connected to the network 11 permits operations of the robots 21 to 23. If permitted, the processing is ended.

Furthermore, if, at step S11, the mode changing switch 41 of the first robot control device 31 selects not the teaching mode, but the automatic operation mode, the routine proceeds to step S15. At step S15, it is judged if the mode changing switches 42 and 43 of other robot control devices, that is, the second robot control device 32 and third robot control device 33, are in the teaching mode. In the case of the teaching mode, the routine proceeds to step S16. If the automatic operation mode, the processing is ended.

Furthermore, even when it is judged at step S12 that both of the teaching control panel 12 and the other teaching control panel (not shown) are not connected to the network 11, the routine proceeds to step S16. Furthermore, as will be understood from FIG. 3, at step S13, even if the enable devices 13 of the teaching control panels which are connected to the network 11 do not permit operations of the robots 21 to 23, the routine proceeds to step S16. Further, at step S16, the drive power of the robot 21 which corresponds to the first robot control device 31 is cut off.

Therefore, for example, when the mode changing switch 41 of the first robot control device 31 selects the automatic operation mode and the mode changing switches 42, 43 of the second robot control device 32 and third robot control device 33 select the teaching mode, when teaching the second robot 22 and robot 23, the drive power of the first robot 21 can be cut off. For this reason, the operator can safely teach the second robot 22 and the robot 23 without being exposed to danger by the first robot 21.

In this regard, as explained above, in the first and second embodiments, when another operator connects another teaching control panel (not shown) to the network 11, the operator who uses the teaching control panel 12 and the other operator who uses the other teaching control panel (not shown) can simultaneously perform teaching operations of the robots.

However, sometimes without recognizing that a certain operator is performing a teaching operation on one robot, another operator will start a teaching operation of another robot. In such a case, the other operator may not be able to recognize movement of the robot which is taught by that certain operator. Therefore, a plurality of operators simultaneously performing teaching operations is not preferable in terms of safety.

For this reason, in a not shown embodiment, when another teaching control panel (not shown) is connected to the network 11 in addition to the teaching control panel 12, it is also possible to cut off the drive power of all of the robots 21 to 23. Therefore, even when the other operator does not recognize a teaching operation of the certain operator, if the other operator connects the other teaching control panel to the network 11, the drive power of the robot is cut off. For this reason, the situation where a plurality of operators simultaneously perform teaching operations can be avoided and the safety of these operators can be secured.

In this regard, in the first and second embodiments, even if the enable devices 13 are used to prohibit operations of the robots 21 to 23, if the automatic operation mode is selected, these robots will not stop. For this reason, in particular at the time of an emergency, the safety of the operator may not be able to be secured.

In the present invention, as shown in FIG. 1 and FIG. 2, the teaching control panel 12 comprises an emergency stop button 14. The emergency stop button 14 enables drive power of all of the robots 21 to 23 to be cut regardless of the mode which is selected by the mode changing switches 40 and 41 to 43. In other words, the emergency stop button 14 cuts the drive power of all of the robots 21 to 23 even if the automatic operation mode has been selected. For this reason, an operator can push the emergency stop button 14 to thereby make all of the robots 21 to 23 stop. As a result, even in an emergency, the safety of the operators can be secured.

Advantageous Effects of Invention

In the first and second aspects, if preparing at least one teaching control panel, it can be operated to teach at least two robots, so the cost of the robot system can be suppressed. Furthermore, when, in the state where the teaching mode is selected, an operator uses the enable device to not allow operation of the robots, the drive power of all of the robots to be taught is cut off. Therefore, the operator can safely perform teaching operations and the efficiency of teaching operations is improved.

In the third aspect, only the robot of a robot control device at which the teaching mode is selected is allowed to operate. For this reason, when teaching a robot of a robot control device at which the teaching mode is selected, the safety of the operator will not be threatened by a robot of a robot control device at which the automatic operation mode has been selected.

In the fourth aspect, even when, without knowing that there is an existing operator who is engaged in a teaching operation, another operator engages in a teaching operation, the safety of these operators can be secured.

In the fifth aspect, by operating the emergency stop device, all robots are made to stop regardless of the mode selected by the mode changing device. Therefore, at the time of an emergency, the safety of the operators can be secured.

In the sixth and seventh aspects, in the state where, regardless of the teaching control panel being disconnected, the teaching mode is selected, the drive power of the robot can be cut off. Therefore, the safety of the operators can be secured.

Typical embodiments were used to explain the present invention, but a person skilled in the art would understand that the above-mentioned changes and various other changes, deletions, and additions may be made without departing from the scope of the present invention.

What is claimed is:

1. A robot system for controlling drive power supplied to at least two robots, the robot system comprising:
    at least two robot control devices which respectively control said at least two robots;
    a network which connects said at least two robot control devices;
    a teaching control panel which is connected with said network and is used for teaching operations of said at least two robots;
    an enable device which is provided at said teaching control panel and which has
        a first state permitting said teaching operations of said at least two robots, and
        a second state prohibiting said teaching operations of said at least two robots;
    a mode changing device which is connected to said network and which selects either an automatic operation mode by which said at least two robots are automatically operated or a teaching mode by which said teaching control panel is used to teach said at least two robots;
    wherein when said mode changing device selects said automatic operation mode, regardless of whether said enable device is in the first state or the second state, drive power to all of said at least two robots is supplied,
    wherein when said mode changing device selects said teaching mode and said enable device is in the second state, drive power to all of said at least two robots is cut off, and
    wherein when said teaching control panel is disconnected from said network and said mode changing device selects said teaching mode, drive power to all of said at least two robots is cut off.

2. The robot system according to claim 1, further comprising another teaching control panel,
    wherein when said teaching control panel and said another teaching control panel are simultaneously connected to said network, drive power to all of said at least two robots is cut off.

3. The robot system according to claim 1 wherein
said teaching control panel comprises an emergency stop device, and
when said emergency stop device is operated, drive power to all of said at least two robots is cut off.

* * * * *